United States Patent
Ma et al.

(10) Patent No.: US 7,181,397 B2
(45) Date of Patent: Feb. 20, 2007

(54) SPEECH DIALOG METHOD AND SYSTEM

(75) Inventors: Changxue C. Ma, Barrington, IL (US);
Yan M. Cheng, Inverness, IL (US);
Chen Liu, Lisle, IL (US); Ted Mazurkiewicz, Lake Zurich, IL (US);
Steven J. Nowlan, South Barrington, IL (US); James R. Talley, Austin, TX (US); Yuan-Jun Wei, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 10 days.

(21) Appl. No.: 11/118,670

(22) Filed: Apr. 29, 2005

(65) Prior Publication Data
US 2006/0247921 A1     Nov. 2, 2006

(51) Int. Cl.
*G10L 15/14*     (2006.01)
(52) U.S. Cl. ...................................... 704/251
(58) Field of Classification Search ...................... None
See application file for complete search history.

(56) References Cited

U.S. PATENT DOCUMENTS

| 6,088,428 | A  | * | 7/2000 | Trandal et al. ........... 379/88.02 |
| 6,934,756 | B2 | * | 8/2005 | Maes ......................... 709/227 |
| 7,013,005 | B2 | * | 3/2006 | Yacoub et al. ......... 379/265.13 |

OTHER PUBLICATIONS

Pieraccini, et al., "Factorization Of Language Constrainsts In Speech Recognition," AT&T Bell Laboratories, Murray Hill, NJ, pp. 299-306, USA.

Moreau, et al., "Confidence Measure and Incremental Adaptation For The Rejection of Incorrect Data," France Telecom, CNET/DIH/DIPS, pp. 1-4, ICASSP 2000.

Zhaobing, et al., "A New Combined Modeling of Continuous Speech Recognition," High-Tech Innovation Center, National Laboratory Of Pattern Recognition and Institute of Automation, Chinese Academy of Science, Beijing, China, pp. 597-602, IEEE 2003.

Caminero, et al., "On-Line Garbage Modeling with Discriminant Analysis for Utterance Verification," Speech Technology Group, Telefonica Investigacion y Desarrollo, Madrid, Spain, pp. 2111-2114.

* cited by examiner

*Primary Examiner*—Susan McFadden

(57) ABSTRACT

An electronic device (300) for speech dialog includes functions that receive (305, 105) a speech phrase that comprises a request phrase that includes an instantiated variable (215), generate (335, 115) pitch and voicing characteristics (315) of the instantiated variable, and performs speech recognition (319, 125) of the instantiated variable to determine a most likely set of acoustic states (235). The electronic device may generate (335, 140) a synthesized value of the instantiated variable using the most likely set of acoustic states and the pitch and voicing characteristics of the instantiated variable. The electronic device may use a table of previously entered values of variables that have been determined to be unique, and in which the values are associated with a most likely set of acoustic states and the pitch and voicing characteristics determined at the receipt of each value to disambiguate (425, 430) a newly received instantiated variable.

15 Claims, 4 Drawing Sheets

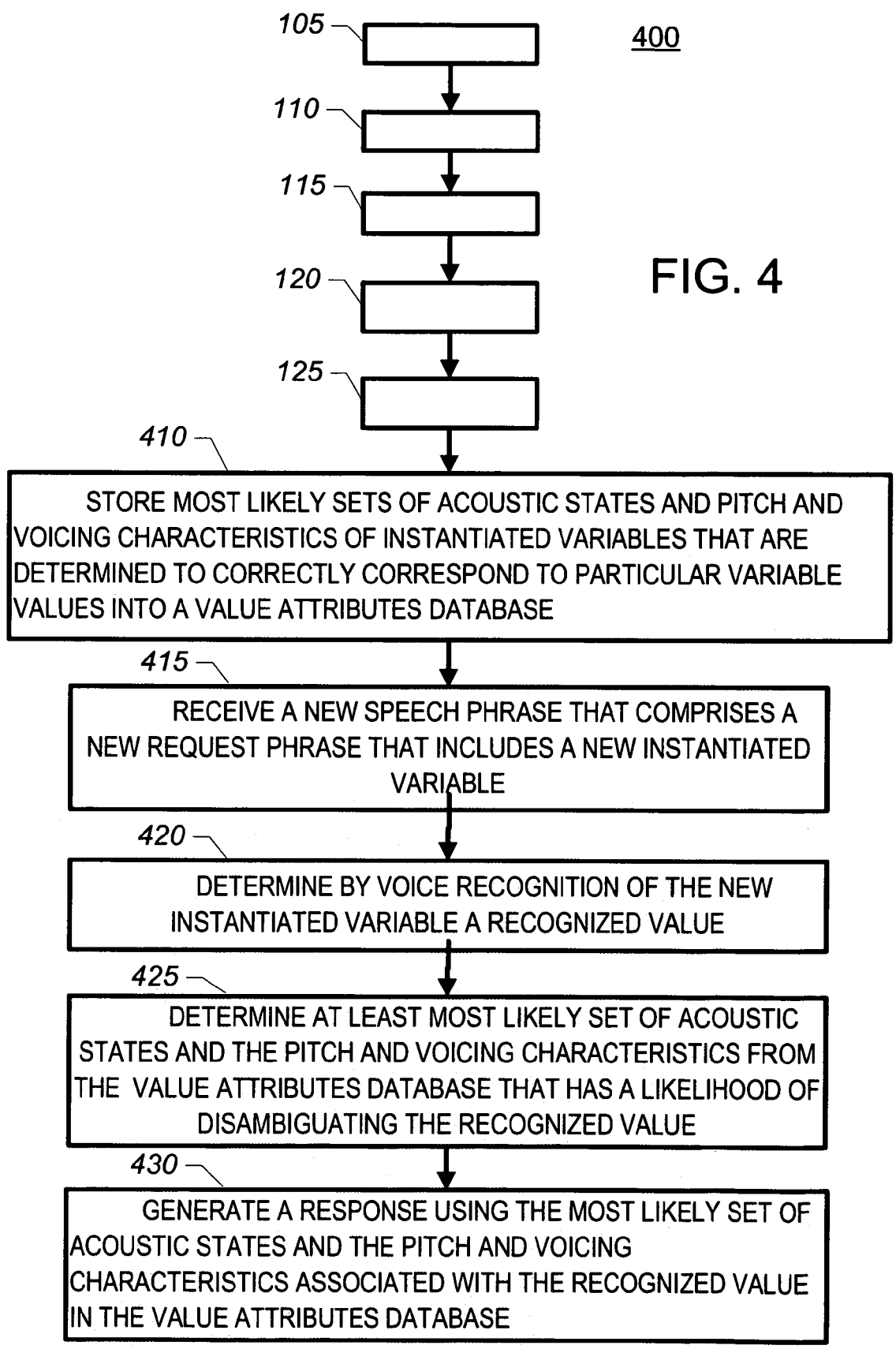

SPEECH DIALOG METHOD AND SYSTEM

FIELD OF THE INVENTION

The present invention is in the field of speech dialog systems, and more specifically in the field of confirmation of phrases spoken by a user.

BACKGROUND

Current dialog systems often use speech as input and output modalities. A speech recognition function is used to convert speech input to text and a text to speech (TTS) function is used to present text as speech output. In many dialog systems, this TTS is used primarily to provide audio feedback to confirm the speech input. For example, in handheld communication devices, a user can use the speech input for name dialing. Reliability is improved when TTS is used to confirm the speech input. However, conventional confirmation functions that use TTS take a significant amount of time and resources to develop for each language and also consume significant amounts of memory resources in the handheld communication devices. This becomes a major problem for world-wide deployment of multi-lingual devices using such dialogue systems.

BRIEF DESCRIPTION OF THE DRAWINGS

The present invention is illustrated by way of example and not limitation in the accompanying figures, in which like references indicate similar elements, and in which:

FIG. 4 is a flow chart that shows a speech dialog method in accordance with some embodiments of the present invention.

Figure 1:
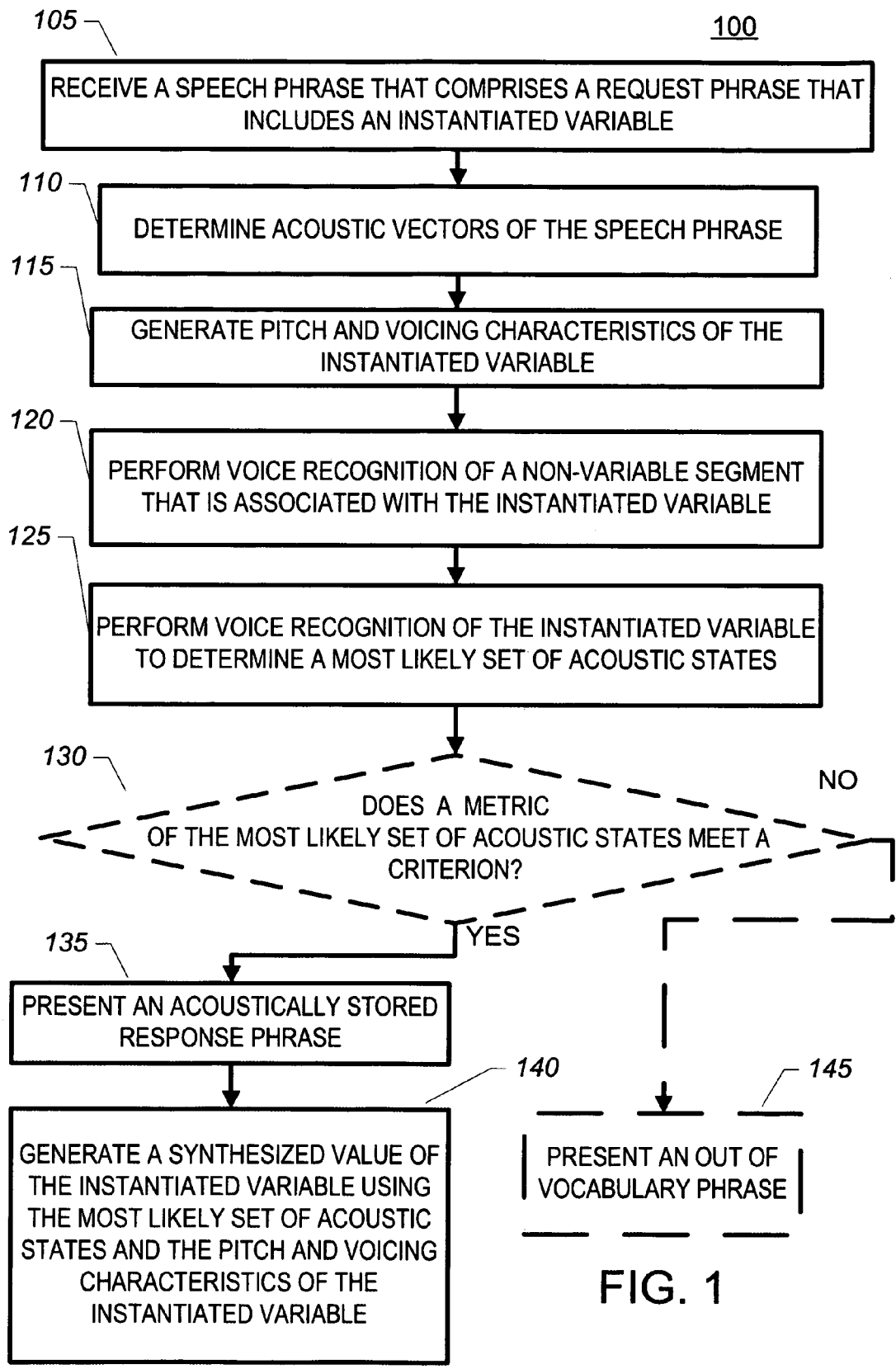
FIG. 1 is a flow chart that shows a speech dialog method in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular embodiments of speech dialog systems in accordance with the present invention, it should be observed that the embodiments of the present invention reside primarily in combinations of method steps and apparatus components related to speech dialog systems. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

It will also be understood that the terms and expressions used herein have the ordinary meaning as is accorded to such terms and expressions with respect to their corresponding respective areas of inquiry and study except where specific meanings have otherwise been set forth herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

A "set" as used in this document may mean an empty set. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, source code, object code, a shared library/dynamic load library and/or other sequence of instructions designed for execution on a computer system.

Figure 2:
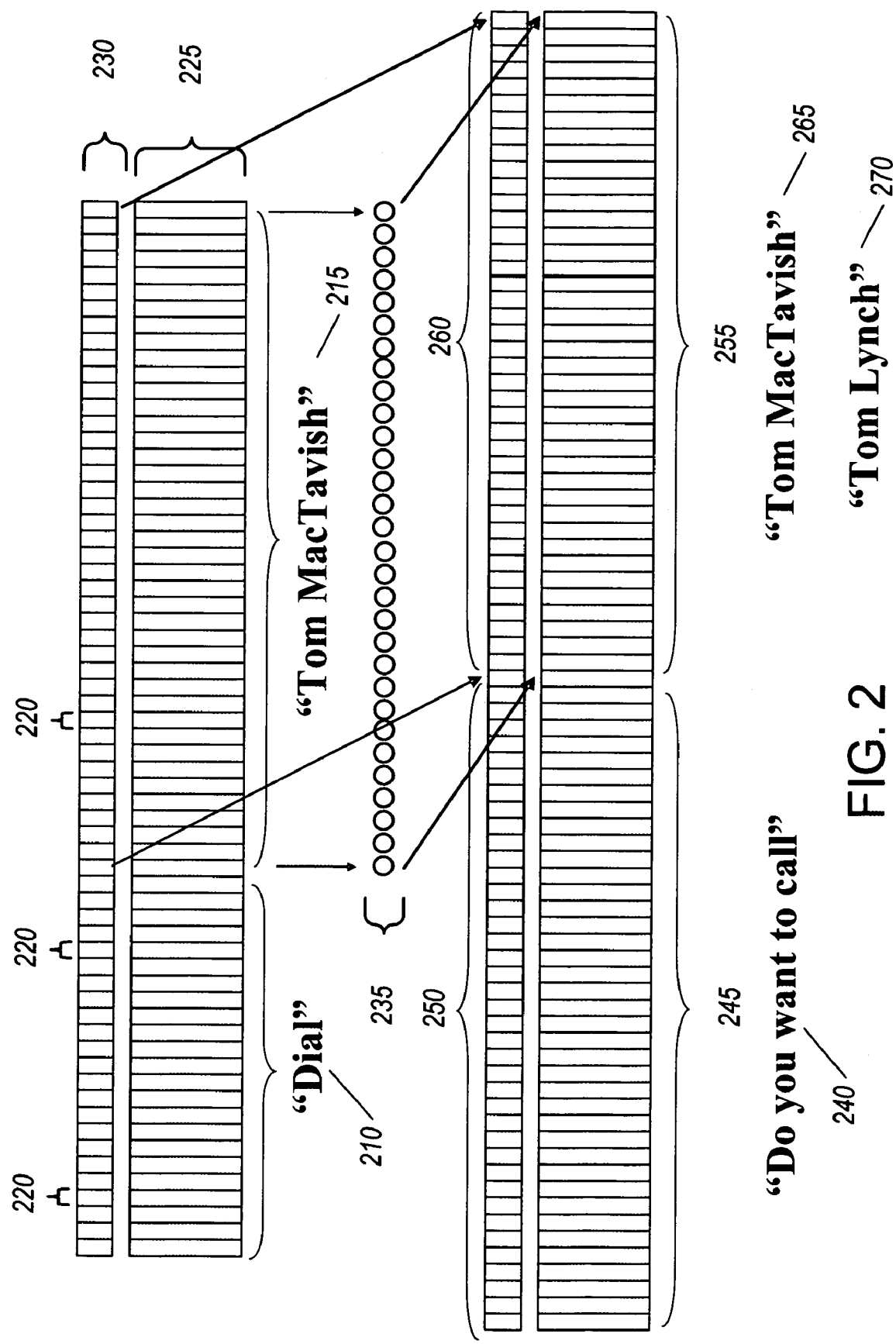
FIG. 2 is a diagram of an analysis of an exemplary speech phrase in accordance with some embodiments of the present invention.
Figure 3:
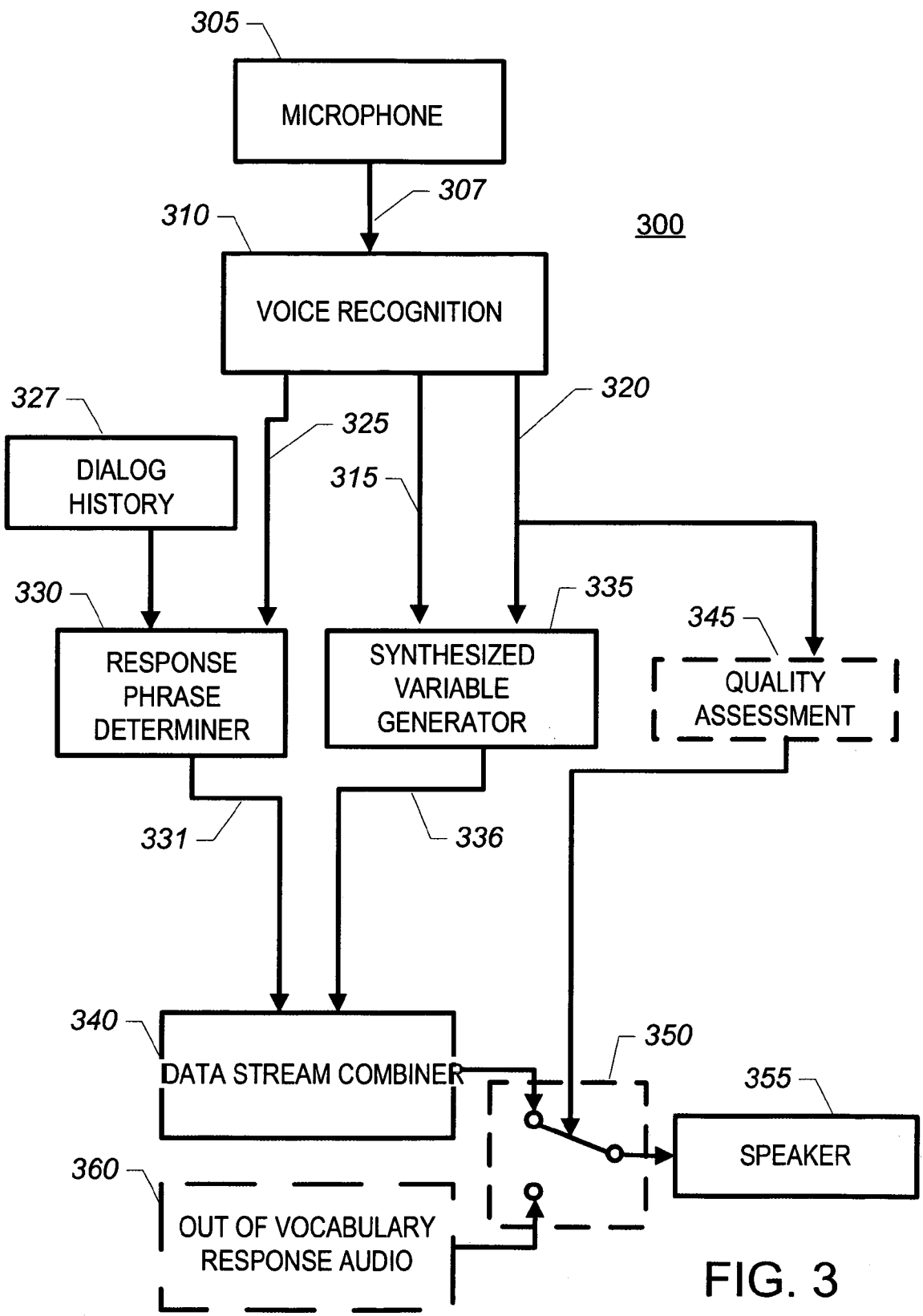
FIG. 3 is a block diagram of an electronic device that performs speech dialog, in accordance with some embodiments of the present invention.

Referring to FIGS. 1, 2, and 3 a flow chart 100 (FIG. 1) of some steps used in a method for speech dialog, a diagram of an analysis of a speech phrase, and a block diagram of an electronic device 300 (FIG. 3) are shown, in accordance with some embodiments of the present invention. At step 105 (FIG. 1), a speech phrase that is uttered by a user during a dialog is received by a microphone 305 (FIG. 3) of the electronic device 300 and converted to a sampled digital electrical signal 307 by the electronic device 300 using a conventional technique. The speech phrase comprises a request phrase that includes an instantiated variable, and may further comprise a non-variable segment. In an example used in FIG. 2, the speech phrase is "Dial Tom MacTavish". In this speech phrase, "Dial" is word that is a non-variable segment and "Tom MacTavish" is a name that is an instantiated variable (i.e., it is a particular value of a variable). The non-variable segment in this example is a command <Dial>, and the variable in this example has a variable type that is <dialed name>. The speech phrase may alternatively include no non-variable segments or more than one non-variable segment, and may include more than one instantiated variable. For example, in response to the received speech phrase example shown in FIG. 2, the electronic device may synthesize a response "Please repeat the name", for which a valid speech phrase may include only the name, and no non-variable segment. In another example, the speech phrase may be "Email the picture to Jim Lamb". In this example, "Email" is a non-variable segment, "picture" is an instantiated variable of type <email object>, and "Jim Lamb" is an instantiated variable of the type <dialed name>. The electronic device 300 stores mathematical models of sets of values of the variables and non-variable segments in a conventional manner, such as in a hidden Markov model (HMM). There may be more than one HMM, such as one for non-variable segments and one for each of several types of variables, or the HMM may be a combined model for all types of variables and non-variable segments. At step 110 (FIG. 1), a voice recognition function 310 (FIG. 3) of the electronic device 300 processes the digitized electronic signal of the speech phrase at regular intervals 220 (FIG. 2), such as 10 milliseconds, and generates pitch and voicing characteristics 315 and generates acoustic vectors of the speech phrase. The acoustic vectors may be mel-frequency cepstrum coefficients (MFCC) or may be feature vectors of another conventional (or non-conventional) type. These may be more generally described as types of acoustic characteristics. In the example illustrated by FIG. 2, acoustic vectors are represented by a series of boxes 225 and the pitch and voicing characteristics are represented by a series of boxes 230. Using a stored model of acoustic states that is derived from acoustic states for a set of values (such as Tom MacTavish, Tom Lynch, Steve Nowlan, Changxue Ma, . . . ) of at least one type of variable (such as <dialed name>) the voice recognition function 310 selects a set of acoustic states from the stored model that are most likely representative of the received acoustic vectors for each instantiated variable and non-variable segment (when a non-variable segment exists). In one example, the stored model is a conventional hidden Markov model (HMM), although other models could be used. In the more general case, the states that represent the stored values of the variables are defined such that they may be used by the mathematical model to find a close match to a set of acoustic characteristics taken from a segment of the received audio to a set of states that represents a value of a variable. Although the HMM model is widely used in conventional voice recognition systems for this purpose, other models are known and other models may be developed; any of them may be beneficially used in embodiments of the present invention. The selected set of acoustic states for a non-variable segment identifies the value 325 (FIG. 3) of the non-variable segment, completing a voice recognition of the non-variable segment at step 120. The set of acoustic states that most likely represents an instantiated variable is termed the most likely set of acoustic states 320 (FIG. 3) for the instantiated variable, and the selection of the most likely set of acoustic states completes the aspects of voice recognition for the instantiated variable at step 125. In the example of FIG. 2, the most likely set of states for the instantiated variable "Tom MacTavish" are shown as a series of acoustic states 235.

In accordance with some embodiments, a response phrase determiner 330 (FIG. 3) determines a response phrase using the identified value 325 of the non-variable segment (when it exists in the voice phrase) in conjunction with a dialog history generated by a dialog history function 327 (FIG. 3). In the example shown in FIG. 2, the non-variable value <Dial> has been determined and may be used without a dialog history to determine that audio for a response phrase "Do you want to call" 240 is to be generated. In some embodiments, a set of acoustic states for each value of response phrases are stored in the electronic device 300, and are used with stored pitch and voicing values to generate a digital audio signal 331 of the response phrase by conventional voice synthesis techniques, which is represented in FIG. 2 as a set of acoustic vectors 245 and associated pitch and voicing characteristics 250. In other embodiments, digitized audio samples of the response phrases are stored and used directly to generate the digital audio signal 331 of the response phrase. The electronic device 300 further comprises a synthesized instantiated variable generator 335 that generates a digitized audio signal 336 of a synthesized instantiated variable from the most likely set of acoustic states aligned with the pitch and voicing characteristics of the received audio phrase, represented in FIG. 2 by acoustic vectors 255 and pitch and voicing characteristics 260. The duration of the pitch and voicing characteristics are expanded or contracted during the alignment to match the acoustic vectors generated from the most likely set of acoustic states. A data stream combiner 340 sequentially combines the digitized audio signals of the response phrase and the synthesized instantiated variable in an appropriate order. During the combining process, the pitch and voicing characteristics of the response phrase may be modified from those stored in order to blend well with those used for the synthesized instantiated variable.

In the example illustrated in FIG. 2, when the selected most likely set of acoustic states is for the value of the called name that is Tom MacTavish, the presentation of the response phrase and the synthesized instantiated variable, "Tom MacTavish" 265 would typically be quite understandable to the user in most circumstances, allowing the user to affirm the correctness of the selection. On the other hand, when the selected most likely set of acoustic states is for a value of the called name that is, for example Tom Lynch, the presentation of the response phrase and the synthesized instantiated variable "Tom Lynch" 270 would typically be harder for the user to mistake as the desired Tom MacTavish because not only was the wrong value selected and used, it is presented to the user in most circumstances with wrong pitch and voicing characteristics, allowing the user to more easily dis-affirm the selection. Essentially, by using the pitch and voicing of the received phrase, differences are exaggerated between a value of a variable that is correct and a value of the variable that is phonetically close but incorrect.

In some embodiments, an optional quality assessment function 345 (FIG. 3) of the electronic device 300 determines a quality metric of the most likely set of acoustic states, and when the quality metric meets a criterion, the quality assessment function 345 controls a selector 350 to couple the digital audio signal output of the data stream combiner to an speaker function that converts the digital audio signal to an analog signal and uses it to drive a speaker. The determination and control performed by the quality assessment function 345 (FIG. 3) is embodied as optional step 130 (FIG. 1), at which a determination is made whether a metric of the most likely set of acoustic vectors meets a criterion. The aspect of generating the response phrase digital audio signal 331 (FIG. 3) by the response phrase determiner 330 is embodied as step 135 (FIG. 1), at which an acoustically stored response phrase is presented. The aspect of generating a digitized audio signal 336 of a synthesized instantiated variable using the most likely set of acoustic states and the pitch and voicing characteristics of the instantiated variable is embodied as step 140 (FIG. 1).

In those embodiments in which the optional quality assessment function 345 (FIG. 3) determines a quality metric of the most likely set of acoustic states, when the quality metric does not meet the criterion, the quality assessment function 345 controls an optional selector 350 to couple a digitized audio signal from an out-of-vocabulary (OOV) response audio function 360 to the speaker function 355 that presents a phrase to a user at step 145 (FIG. 1) that is an out-of-vocabulary notice. For example, the out-of-vocabulary notice may be "Please repeat your last phrase". In the same manner as for the response phrases, this OOV phrase may be stored as digital samples or acoustic vectors with pitch and voicing characteristics, or similar forms.

In embodiments not using a metric to determine whether to present the OOV phrase, the output of the data stream combiner function 340 is coupled directly to the speaker function 355, and steps 130 and 145 (FIG. 1) are eliminated.

The metric that is used in those embodiments in which a determination is made as to whether to present an OOV phrase may be a metric that represents a confidence that a correct selection of the most likely set of acoustic states has been made. For example, the metric may be a metric of a distance between the set of acoustic vectors representing an instantiated variable and the selected most likely set of acoustic states.

Referring to FIG. 4, a flow chart of a method for speech dialog is shown, in accordance with some embodiments of the present invention. Steps 105–125 are described above with reference to FIG. 1. At step 410, instantiated variables that are determined to correctly correspond to unique values for at least one variable are stored into a value attributes database, each identified value being associated with the stored most likely set of acoustic states and pitch and voicing characteristics of the instantiated variable from which the value was identified. A new speech phrase that comprises a new request phrase that includes a new instantiated variable is received at step 415. A recognized value is determined at step 420 by voice recognition of the second instantiated variable. At least one most likely set of acoustic states and pitch and voicing characteristics is determined from the value attributes database's association with the recognized value at step 425 that has a likelihood of disambiguating the recognized value. At step 430, a response is generated using the most likely set of acoustic states and the pitch and voicing characteristics associated with the recognized value in the value attributes database. It will be appreciated that by this method, acoustic states and the pitch and voicing associated with one or more previously received variables can be used in lieu of a newly received instantiated variable, in order to advantageously disambiguate the instantiated variable.

The embodiments of the speech dialog methods 100, 400 and electronic device 300 described herein may be used in a wide variety of electronic apparatus such as, but not limited to, a cellular telephone, a personal entertainment device, a pager, a television cable set top box, an electronic equipment remote control unit, an portable or desktop or mainframe computer, or an electronic test equipment. The embodiments provide a benefit of less development time and require fewer processing resources than prior art techniques that involve speech recognition down to a determination of a text version of the most likely instantiated variable and the synthesis from text to speech for the synthesized instantiated variable. These benefits are partly a result of avoiding the development of the text to speech software systems for synthesis of the synthesized variables for different spoken languages for the embodiments described herein.

It will be appreciated the speech dialog embodiments described herein may be comprised of one or more conventional processors and unique stored program instructions that control the one or more processors to implement, in conjunction with certain non-processor circuits, some, most, or all of the functions of the speech dialog embodiments described herein. The unique stored programs made be conveyed in a media such as a floppy disk or a data signal that downloads a file including the unique program instructions. The non-processor circuits may include, but are not limited to, a radio receiver, a radio transmitter, signal drivers, clock circuits, power source circuits, and user input devices. As such, these functions may be interpreted as steps of a method to perform accessing of a communication system. Alternatively, some or all functions could be implemented by a state machine that has no stored program instructions, in which each function or some combinations of certain of the functions are implemented as custom logic. Of course, a combination of the two approaches could be used. Thus, methods and means for these functions have been described herein.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. Some aspects of the embodiments are described above as being conventional, but it will be appreciated that such aspects may also be provided using apparatus and/or techniques that are not presently known. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for speech dialog, comprising:
   receiving a speech phrase that comprises a request phrase that includes an instantiated variable;
   generating pitch and voicing characteristics of the instantiated variable;
   performing speech recognition of the instantiated variable to determine a most likely set of acoustic states; and
   generating a synthesized value of the instantiated variable using the most likely set of acoustic states and the pitch and voicing characteristics of the instantiated variable.

2. A method for speech dialog according to claim 1, wherein the request phrase further includes a non-variable segment that is associated with the instantiated variable, further comprising:
   performing speech recognition of the non-variable segment; and
   presenting an acoustically stored response phrase.

3. The method for speech dialog according to claim 1, wherein the performing of the speech recognition of the instantiated variable comprises:
   determining acoustic characteristics of the instantiated variable; and
   using a mathematical model of stored lookup values and the acoustic characteristics to determine the most likely set of acoustic states.

4. The method for speech dialog according to claim 3, wherein the mathematical model of stored lookup values is a hidden Markov model.

5. The method for speech dialog according to claim 1, wherein generating the synthesized value of the instantiated variable is performed when a metric of the most likely set of acoustic states meets a criterion, and further comprising:
   presenting an acoustically stored out-of-vocabulary response phrase when the metric of the most likely set of acoustic states fails to meet the criterion.

6. An electronic device for speech dialog, comprising:
   means for receiving a speech phrase that comprises a request phrase that includes an instantiated variable;
   means for generating pitch and voicing characteristics of the instantiated variable;

means for performing speech recognition of the instantiated variable to determine a most likely set of acoustic states; and means for generating a synthesized value of the instantiated variable using the most likely set of acoustic states and the pitch and voicing characteristics of the instantiated variable.

7. The electronic device for speech dialog according to claim 6, wherein the request phrase further includes a non-variable segment that is associated with the instantiated variable, further comprising:

means for performing speech recognition of the non-variable segment; and means for presenting an acoustically stored response phrase.

8. The electronic device for speech dialog according to claim 6, wherein the performing of the speech recognition of the instantiated variable comprises:

means for determining acoustic characteristics of the instantiated variable; and means for using a stored model of acoustic states and the acoustic characteristics to determine the most likely set of acoustic states.

9. The electronic device for speech dialog according to claim 6, wherein generating the synthesized value of the instantiated variable is performed when a metric of the most likely set of acoustic states meets a criterion, and further comprising:

means for presenting an acoustically stored out-of-vocabulary response phrase when the metric of the most likely set of acoustic states fails to meet the criterion.

10. A media that includes a stored set of program instructions, comprising:

a function for receiving a speech phrase that comprises a request phrase that includes an instantiated variable;

a function for generating pitch and voicing characteristics of the instantiated variable;

a function for performing speech recognition of the instantiated variable to determine a most likely set of acoustic states; and a function for generating a synthesized value of the instantiated variable using the most likely set of acoustic states and the pitch and voicing characteristics of the instantiated variable.

11. The media according to claim 10, wherein the request phrase further includes a non-variable segment that is associated with the instantiated variable, further comprising:

a function for performing speech recognition of the non-variable segment; and a function for presenting an acoustically stored response phrase.

12. The media according to claim 10, wherein the function for performing the speech recognition of the instantiated variable comprises:

a function for determining acoustic characteristics of the instantiated variable; and a function for using a mathematical model of stored lookup values and the acoustic characteristics to determine the most likely set of acoustic states.

13. The method for speech dialog according to claim 12, wherein the mathematical model of stored lookup values is a hidden Markov model.

14. The media according to claim 10, wherein the function of generating the synthesized value of the instantiated variable is performed when a metric of the most likely set of acoustic states meets a criterion, and further comprising:

a function for presenting an acoustically stored out-of-vocabulary response phrase when the metric of the most likely set of acoustic states fails to meet the criterion.

15. A method for speech dialog, comprising:

receiving one or more speech phrases that include one or more instantiated variables;

generating pitch and voicing characteristics of the one or more instantiated variables;

performing speech recognition of the instantiated variables to determine a most likely set of acoustic states for each of the one or more instantiated variables;

storing most likely sets of acoustic states and pitch and voicing characteristics of the one or more instantiated variables that are each determined to correctly correspond to a unique value of a variable into a value attributes database, each of the most likely sets of acoustic states and pitch and voicing characteristics being stored in association with the unique value to which it corresponds;

receiving a new speech phrase that comprises a new request phrase that includes a new instantiated variable;

determining by speech recognition of the new instantiated variable a recognized value;

determining a most likely set of acoustic states and pitch and voicing characteristics from the value attributes database that has a likelihood of disambiguating the recognized value;

generating a response using the most likely set of acoustic states and the pitch and voicing characteristics associated with the recognized value in the value attributes database.

* * * * *